M. MILLER.
APPARATUS FOR TREATING BOILER FEED WATER.
APPLICATION FILED SEPT. 1, 1908.
909,008. Patented Jan. 5, 1909.
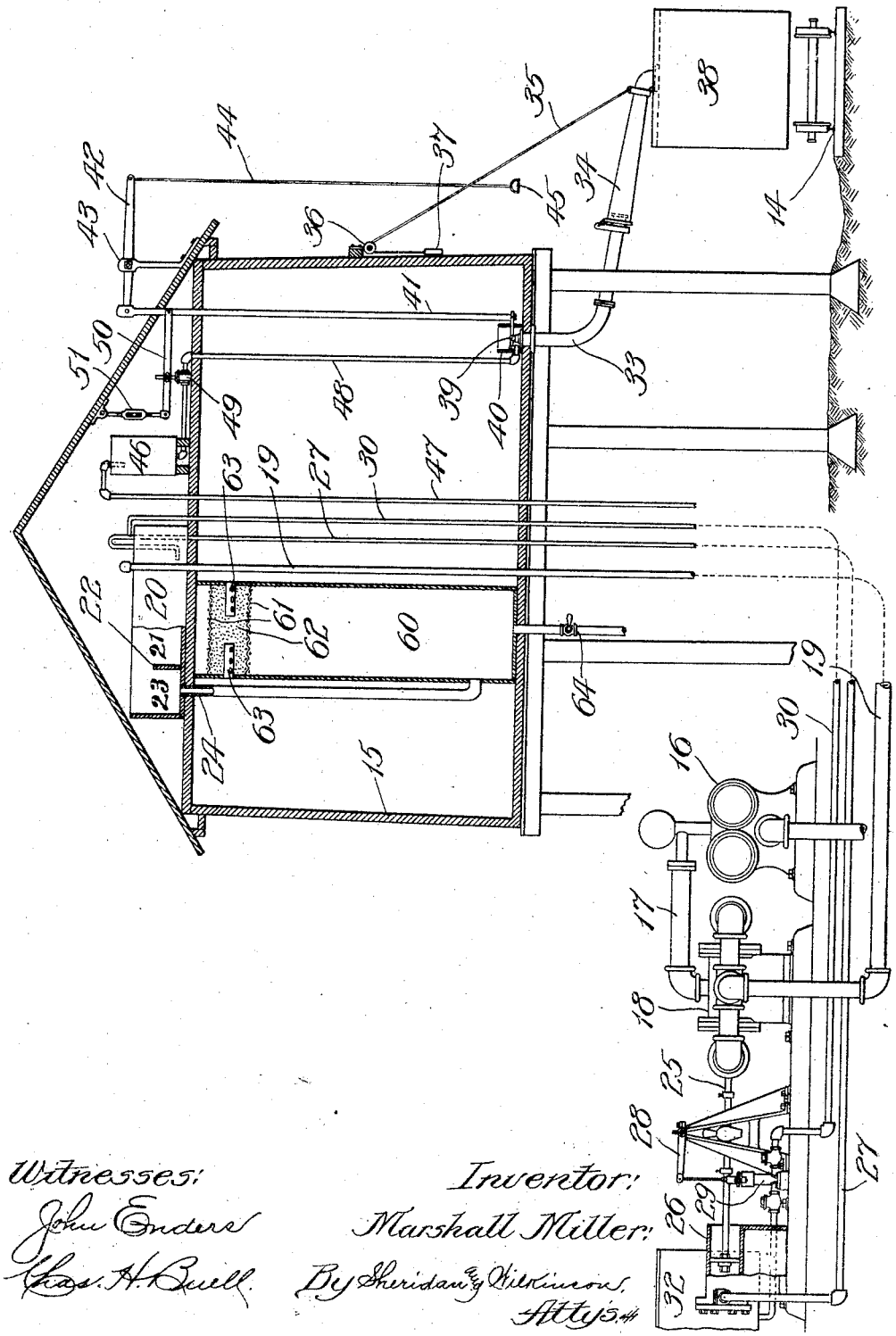
Witnesses:
John Enders
Chas. H. Buell.
Inventor:
Marshall Miller,
By Sheridan & Wilkinson,
Attys.

UNITED STATES PATENT OFFICE.

MARSHALL MILLER, OF ST. LOUIS, MISSOURI.

APPARATUS FOR TREATING BOILER FEED-WATER.

No. 909,008.　　　　　Specification of Letters Patent.　　　　　Patented Jan. 5, 1909.

Application filed September 1, 1908. Serial No. 451,160.

*To all whom it may concern:*

Be it known that I, MARSHALL MILLER, a citizen of the United States, residing at St. Louis, State of Missouri, have invented certain new and useful Improvements in Apparatus for Treating Boiler Feed-Water, of which the following is a specification.

The object of my invention is to provide a new and improved apparatus for treating boiler feed-water.

This object and others will be made apparent in the following specification and claims when taken in connection with the accompanying sheet of drawings, which illustrate the necessary elements of the apparatus in sectional elevation.

As is well-known if the water supplied to a steam boiler has mineral salts in solution these will accumulate in the boiler and in any case will produce more or less objectionable effects. Certain salts, notably magnesium and calcium sulfates, form a hard adherent scale on the inside wall of the boiler and around the flues which greatly obstructs the transmission of heat from the furnace into the boiler and also causes the flues and fire-box to burn out. It has been customary for a long time to add reagents to such water for the purpose of precipitating objectionable salts from the water before entering the boiler. Thus, for example, if the water has calcium sulfate in solution, the addition of sodium carbonate precipitates calcium carbonate, leaving sodium sulfate in solution in the water. Unfortunately sodium sulfate causes the water to foam or prime in the boiler so that if the water is treated to precipitate the objectionable scale forming ingredients this advantage is secured only at the cost of a great disadvantage in the subsequent foaming of the water. However, foaming or priming can be checked to a great extent by the addition of tannin and castor oil as well as other chemicals. Now it has been the practice in certain of the Western States where the locomotives use well water that is highly impregnated with scale forming salts, to give such water a preliminary treatment with soda ash or lime or both for the purpose of precipitating the objectionable salts, and thereafter to add the tannin and castor oil to the water to keep down the foaming. The tannin and castor oil has been added in various ways, but objections arise against each of them.

If the anti-priming ingredients are added to the tank in which the water stands after having had the soda ash or lime treatment, the accumulated precipitates or sludge at the bottom of the tank will precipitate a large portion of the tannin, about 60%. Thus there is a great waste of a somewhat expensive chemical mixture. Moreover, there is necessarily great indefiniteness in the proportion in which the anti-priming chemicals are added. If too much is added it is simply wasted, and if too little is added it fails to stop the priming. As has just been stated the castor oil and tannin are rather expensive so that this indefiniteness in adding them is a serious objection. Another method of adding the anti-priming mixture is to give a pailful of it to the locomotive fireman to be added to the tender tank as needed. But it is obvious that the disadvantage of indefiniteness and the resulting waste would be even greater in this case than where it is added to the roadside water tank.

By my invention the anti-priming mixture is added to the treated water as it flows from the roadside water tank in a stream into the engine tank, and this stream of water is mingled with a proportional stream of the chemical mixture. Thus at all times the desired proportion between the treated water and the anti-priming mixture is realized, the absorption of the tannin by the sludge in the tank is avoided, and the mixture is secured at a minimum care on the part of the attendant.

Having stated the nature of the difficulties which my invention is designed to remedy and the general nature of my apparatus for overcoming these difficulties, I will now proceed to describe the apparatus disclosed in the drawings, which constitutes an embodiment of a particular form of my invention.

Referring to the drawings, the ordinary elevated roadside water tank 15 is placed beside the railway track 14. A feed water pump 16 delivers water through the outlet pipe 17, thence through the water motor-meter 18 to the pipe 19, which empties into a mixing box 20 in the top of the tank 15. This mixing box 20 has a partition 22 which forms a weir across the box making the compartments 21 and 23 on either side thereof. The pipe 19 empties into the compartment 21 and the water therein flows over the weir 22 into the compartment 23 from which the pipe 24 leads into the interior chamber 60. The screen 61 across the upper part of the chamber 60 carries sand 62 and perforated pipes 63 lead from within the body of sand through the side walls of the chamber 60. A drainage outlet 64 is provided for the bottom of the chamber 60. The motor-meter 18 is simply a piston motor operated by the current of water flowing through the pipes 17, 19. On its piston there is connected a piston-rod 25 which directly operates an air pump 26. This air pump 26 delivers a current of air through the pipe 27 and this air current discharges into the fluid contents of the compartment 21 in the receiving box 20.

The reciprocating piston-rod 25 actuated by the motor-meter 18 oscillates the bell-crank 28 and through it drives the small chemical pump 29. This chemical pump 29 draws its supply from the chemical tank 32 and delivers through the pipe 30 to the compartment 21 of the mixing box 20.

It will be seen that the number of reciprocations of the piston-rod 25 in a given time is proportional to the quantity of water that has flowed through the motor-meter 18 in that time. It follows at once that the supply of air through the pipe 27 and of chemical mixture or solution through the pipe 30 will be definitely proportional to the supply of water to the tank, no matter whether the pump 16 works fast or slow. The chemicals supplied through the pipe 30 may have any desired composition, for example, this may be a mixture of soda ash and lime in water. These chemicals mingle with the water in the mixing box 20 being agitated by the air current through the pipe 27, thus starting the chemical action in the mixing box. After the water has discharged through the pipe 24 into the chamber 60 it takes an upward course through the filtering sand 62 and discharges into the tank 15. But not all the precipitate is retained in the compartment 60. This is partly due to the fact that chemical action is not completed until after the water has passed through the sand. Thus it follows that although the greater part of the sludge gathers in chamber 60, whence it may be blown off by opening valve 64, nevertheless there will be some accumulation of sludge in the bottom of the tank 15.

Having now described that part of my invention which relates to the preliminary treatment of the water for the purpose of precipitating the scale forming salts, I will now describe the apparatus for adding the anti-foaming ingredients as the water flows from the tank 15 into the engine tank 38. A pipe 33 leads from the bottom of the tank 15 into the spout 34, this spout being balanced by the counter-weight 37 connected by the rope 35 passing over the pulley 36. The outlet pipe 33 is controlled by a valve 39, which is surrounded by an open topped box 40. This valve 39 is adapted to be opened by an upward pull on the link 41, which hangs down from one end of the lever 42, fulcrumed at 43 and adapted to be operated by the pull rope 44 having a handle 45 at its end. A tank 46 for the anti-priming mixture is mounted in the top of the tank 15 and is adapted to be supplied through the pipe 47. An outlet pipe 48 leads from the bottom of the tank 46 and discharges through the side wall of the box 40. The outlet pipe 48 has a valve 49, which is adapted to be worked from the lever 50, the fulcrum of which is supported by the turn-buckle 51, the opposite end being pivoted to the link 41.

When the locomotive fireman wishes to fill his engine tank 38 he pulls down on the handle 45, thus raising the rod 41 and thereby simultaneously opening the valves 39 and 49. These valves are opened in this way to about the same degree so that if one is only partially open the other will be opened only correspondingly. Thus whether the valves are wide open or not a proportional flow of treated water and anti-foaming mixture is secured. The two currents mingle in the box 40 and discharge directly into the pipe 33. The box 40 prevents the accumulated sludge on the bottom of the tank 15 from flowing out through the pipe 33. In ordinary practice the handle 45 is almost always pulled down as far as it will go so that the openings of the valves 39 and 49 are practically always the same. The relation between the openings of these two valves can be adjusted by means of the turn-buckle 51 and thus a greater or less proportion of anti-foaming mixture can be added to the outflowing stream of treated water.

At any roadside water-tank the head chemist can analyze the water both before and after treatment and can adjust the stroke of the chemical pump 29 so that the proper proportion of chemical mixture or solutions shall be added to the water for the treatment thereof. Next he can determine how much anti-priming mixture the treated water requires and can adjust the turn-buckle 51 accordingly. Thereafter the further operation of the plant requires no exercise of discretion with respect to these matters on the part of the attendant.

I have described the structure of the apparatus employed in my invention and have given a full statement of the operation thereof.

For the purpose of illustration I have described certain specific conditions which my invention is adapted to meet and have described specific apparatus for the treatment of the water in the several stages of the method. But it will be obvious to those skilled in the art that my invention is applicable to a wide variety of other conditions and may be practiced with widely different modifications of apparatus.

I claim:

1. The apparatus for preparing feed water to be used in a steam boiler which consists of means for giving the water a preliminary chemical treatment, a storage tank to receive the treated water, means to draw the water from said tank, a chemical supply source and means to mingle the chemical from said source with the water in a definite proportion, as the water is withdrawn from the tank.

2. The apparatus for preparing feed water to be used in a steam boiler which consists of means for mingling a chemical with the water to precipitate the scale forming salts, a storage tank to receive the treated water, means to draw the water from said tank, an anti-foaming chemical supply tank, and means to mingle the anti-foaming chemical with the water in a definite proportion as the water is withdrawn from the tank.

3. The apparatus for preparing feed water to be used in a steam boiler which consists of a water supply pump, a receiving tank, a conduit leading from the pump to the tank, a motor-meter connected in said conduit and adapted to be actuated by the flow of water therein, a chemical pump adapted to be actuated by said motor-meter, another conduit leading from the chemical pump to the tank, an outlet for the purpose of withdrawing water from the tank, a chemical supply tank, and means to mingle the contents of said last-named tank in definite proportion with the outflowing stream of water from the main tank.

4. The apparatus for preparing feed water to be used in a steam boiler which consists of means for giving the water a preliminary chemical treatment, a storage tank to receive the treated water, an outlet passage leading from said tank above the bottom thereof, a chemical supply tank having an outlet pipe connected with the outlet passage from the main tank, valves controlling both outlet passages, and means for simultaneously actuating said valves.

5. The apparatus for preparing feed water to be used in a steam boiler which consists of means for giving the water a preliminary chemical treatment, a storage tank to receive the treated water, a source of anti-foaming chemical supply, pipes leading from said tank and said source, a valve in each pipe, and means to control said valves simultaneously.

6. The apparatus for preparing feed water to be used in a steam boiler which consists of means for giving the water a preliminary chemical treatment to precipitate the scale forming salts therein, a storage tank to receive the treated water, a storage tank for anti-foaming chemical in fluid form, means to draw from these two tanks simultaneously in definite proportion, and means to adjust said proportion to any desired value.

7. The apparatus for preparing feed water to be used in a steam boiler which consists of means for giving water a preliminary chemical treatment, a storage tank to receive the treated water, a chemical supply tank, outlets from said tanks having controlling valves therefor, a single operating handle and connections therefrom to the two valves, one of said connections comprising an adjustable element.

In testimony whereof, I have subscribed my name.

MARSHALL MILLER.

Witnesses:
J. O. POTTS,
C. H. WOOD.